(12) United States Patent
Lazzara et al.

(10) Patent No.: US 10,266,292 B2
(45) Date of Patent: Apr. 23, 2019

(54) CARRIERS FOR COMPOSITE REINFORCEMENT SYSTEMS AND METHODS OF USE

(71) Applicant: Neptune Research, Inc., Riviera Beach, FL (US)

(72) Inventors: Christopher J. Lazzara, Palm Beach, FL (US); Richard J. Lazzara, Palm Beach, FL (US); Venkatachala S. Minnikanti, Delray Beach, FL (US); Davie Peguero, Lake Park, FL (US); Tony Anderson, Jupiter, FL (US); Armand Herold, Riviera Beach, FL (US)

(73) Assignee: Neptune Research, LLC, Riviera Beach, FL (US)

( * ) Notice: Subject to any disclaimer, the term of this patent is extended or adjusted under 35 U.S.C. 154(b) by 249 days.

(21) Appl. No.: 15/001,980

(22) Filed: Jan. 20, 2016

(65) Prior Publication Data
US 2016/0214336 A1 Jul. 28, 2016

Related U.S. Application Data

(60) Provisional application No. 62/106,629, filed on Jan. 22, 2015, provisional application No. 62/195,560, filed on Jul. 22, 2015.

(51) Int. Cl.
*B29C 73/00* (2006.01)
*B32B 43/00* (2006.01)
(Continued)

(52) U.S. Cl.
CPC ............ *B65B 31/006* (2013.01); *B29C 73/10* (2013.01); *F16L 55/1686* (2013.01);
(Continued)

(58) Field of Classification Search
CPC ....... B32B 5/26; B32B 5/28; B32B 2260/021; B32B 2260/023; B32B 2260/046;
(Continued)

(56) References Cited

U.S. PATENT DOCUMENTS 3,669,158 A * 6/1972 Phillips ................. D03D 3/005
138/118
4,086,378 A 4/1978 Kam
(Continued)

FOREIGN PATENT DOCUMENTS

EP 0 507 220 10/1992
EP 1028095 8/2000
(Continued)

OTHER PUBLICATIONS

International Search Report for International Application No. PCT/US16/14115 dated Apr. 29, 2016, 3 pages.
(Continued)

*Primary Examiner* — Philip C Tucker
*Assistant Examiner* — Brian R Slawski
(74) *Attorney, Agent, or Firm* — Nixon Peabody LLP

(57) ABSTRACT

Systems and methods for reinforcing structures with composite reinforcement systems are disclosed herein. According to aspects of the present disclosure, a carrier of a composite reinforcement system for repairing and/or reinforcing a physical structure is disclosed. The carrier includes a plurality of carbon fibers. Each carbon fiber has a longitudinal axis and a length extending in a generally 0 degree direction. The carrier further includes at least one fiberglass fiber having a longitudinal axis and a length extending in a generally 90 degree direction across the plurality of carbon fibers. The plurality of carbon fibers constitute at least about 70 wt % of the carrier and the at least one fiberglass fiber constitutes at most about 30 wt % of the carrier.

21 Claims, 6 Drawing Sheets

(51) Int. Cl.
| | |
|---|---|
| *D04H 13/00* | (2006.01) |
| *B29C 70/86* | (2006.01) |
| *B65H 81/00* | (2006.01) |
| *D04H 3/08* | (2006.01) |
| *B29C 63/10* | (2006.01) |
| *C09J 5/02* | (2006.01) |
| *B32B 5/12* | (2006.01) |
| *B32B 37/00* | (2006.01) |
| *B29C 65/00* | (2006.01) |
| *B65B 31/00* | (2006.01) |
| *B29C 73/10* | (2006.01) |
| *F16L 55/168* | (2006.01) |
| *B29K 75/00* | (2006.01) |
| *B29K 105/08* | (2006.01) |
| *B29K 307/04* | (2006.01) |
| *B32B 5/26* | (2006.01) |
| *B29C 70/20* | (2006.01) |
| *B32B 5/28* | (2006.01) |
| *B29C 65/48* | (2006.01) |
| *B29C 70/22* | (2006.01) |
| *B29C 65/50* | (2006.01) |
| *B29K 63/00* | (2006.01) |
| *B29K 309/08* | (2006.01) |
| *F16L 58/10* | (2006.01) |

(52) U.S. Cl.
CPC ........ *B29C 65/485* (2013.01); *B29C 65/5014* (2013.01); *B29C 70/202* (2013.01); *B29C 70/226* (2013.01); *B29K 2063/00* (2013.01); *B29K 2075/00* (2013.01); *B29K 2105/089* (2013.01); *B29K 2307/04* (2013.01); *B29K 2309/08* (2013.01); *B32B 5/26* (2013.01); *B32B 5/28* (2013.01); *B32B 2260/021* (2013.01); *B32B 2260/023* (2013.01); *B32B 2260/046* (2013.01); *B32B 2262/101* (2013.01); *B32B 2262/106* (2013.01); *F16L 58/1063* (2013.01)

(58) Field of Classification Search
CPC ........ B32B 2262/101; B32B 2262/106; B29C 70/20; B29C 70/202; B29C 70/22; B29C 70/226; B29C 70/228; B29C 73/10; B29C 65/485; B29C 65/5014; D10B 2505/02
USPC ..... 156/60, 94, 98, 148, 149, 166, 169, 172, 156/180, 181, 184, 185, 187, 195, 242, 156/244.11, 296, 307.1, 307.3, 307.7; 428/98, 105, 113
See application file for complete search history.

(56) References Cited

U.S. PATENT DOCUMENTS

| | | | |
|---|---|---|---|
| 4,519,856 A | 5/1985 | Lazzara | |
| 4,898,898 A | 2/1990 | Fitzgerald | |
| 5,030,493 A | 7/1991 | Rich | |
| 5,560,985 A | 10/1996 | Watanabe | |
| 5,607,527 A | 3/1997 | Isley, Jr. | |
| 5,726,222 A | 3/1998 | Sawaoka | |
| 5,732,743 A | 3/1998 | Livesay | |
| 5,786,437 A | 7/1998 | Nicholas | |
| 5,789,073 A | 8/1998 | Odagiri | |
| 5,894,864 A | 4/1999 | Rich | |
| 6,361,032 B1 | 3/2002 | Lawson | |
| 6,386,236 B1 | 5/2002 | Buckley | |
| 6,429,157 B1 | 8/2002 | Kishi | |
| 6,475,596 B2 | 11/2002 | Hsiao | |
| 6,620,471 B1 | 9/2003 | Do | |
| 6,638,615 B2 | 10/2003 | Kobayashi | |
| 6,660,395 B2 | 12/2003 | McGarry | |
| 6,713,144 B2 | 3/2004 | Bundo | |
| 6,780,923 B2 | 8/2004 | Guha | |
| 6,815,053 B2 | 11/2004 | Inoue | |
| 6,911,169 B2 | 6/2005 | Kwag | |
| 7,026,043 B2 | 4/2006 | Jander | |
| 7,026,377 B1 | 4/2006 | Grant | |
| 7,048,985 B2 | 5/2006 | Mack | |
| 7,151,129 B2 | 12/2006 | Ishikawa | |
| 7,192,634 B2 | 3/2007 | Carter | |
| 7,246,990 B2 | 7/2007 | Xie | |
| 7,361,618 B2 | 4/2008 | Homma | |
| 7,412,956 B2 | 8/2008 | Gotou | |
| 7,513,275 B2 | 4/2009 | Lazzara | |
| 7,673,550 B2 | 3/2010 | Karmaker | |
| 7,682,274 B2 | 3/2010 | Akiyama | |
| 7,832,983 B2 | 11/2010 | Kruckenberg | |
| 7,856,778 B2 | 12/2010 | Pantelides | |
| 8,101,035 B2 | 1/2012 | Stenard | |
| 8,137,798 B2 | 3/2012 | Arai et al. | |
| 8,168,292 B2 | 5/2012 | Morin | |
| 8,241,739 B2 | 8/2012 | Schonfeld | |
| 8,286,919 B2 | 10/2012 | Gerken | |
| 8,309,213 B2 | 11/2012 | Clarke | |
| 8,522,827 B2 | 9/2013 | Lazzara | |
| 8,530,533 B2 | 9/2013 | Lehmann | |
| 8,562,886 B2 | 10/2013 | DiFonzo | |
| 8,844,464 B2 | 9/2014 | Lazzara | |
| 8,910,670 B2 | 12/2014 | Tseng | |
| 8,957,120 B2 | 2/2015 | Berthevas | |
| 8,980,395 B2 | 3/2015 | Ash | |
| 9,067,341 B2 | 6/2015 | Wehner | |
| 9,096,020 B2 | 8/2015 | Lazzara | |
| 9,175,470 B2 | 11/2015 | Yin | |
| 9,186,993 B1 | 11/2015 | Webb | |
| 2003/0113531 A1* | 6/2003 | Hajmrle | C08K 3/08 428/327 |
| 2004/0050006 A1 | 3/2004 | Park | |
| 2006/0016550 A1 | 1/2006 | Connors, Jr. | |
| 2008/0090966 A1 | 4/2008 | Hayes | |
| 2010/0021682 A1 | 1/2010 | Liang | |
| 2010/0143692 A1 | 6/2010 | Ryan | |
| 2010/0147409 A1 | 6/2010 | Lu et al. | |
| 2010/0237606 A1 | 9/2010 | Lazzara | |
| 2011/0000746 A1 | 1/2011 | Pelto-Huikko | |
| 2012/0001393 A1 | 1/2012 | Lazzara | |
| 2013/0001817 A1 | 1/2013 | Bessho | |
| 2013/0052899 A1 | 2/2013 | Li | |
| 2013/0065469 A1 | 3/2013 | Kang | |
| 2013/0101762 A1 | 4/2013 | Malis | |
| 2013/0157060 A1* | 6/2013 | Komori | B62D 29/005 428/414 |
| 2013/0210298 A1 | 8/2013 | Ortlepp | |
| 2013/0316128 A1 | 11/2013 | Waku | |
| 2014/0011016 A1* | 1/2014 | Vanimisetti | C09J 11/04 428/317.5 |
| 2014/0057514 A1 | 2/2014 | Goto | |
| 2014/0178652 A1 | 6/2014 | Gross | |
| 2014/0224374 A1 | 8/2014 | Tseng | |
| 2014/0227928 A1 | 8/2014 | Ehbing | |
| 2014/0338830 A1 | 11/2014 | Petroski | |
| 2015/0005684 A1 | 1/2015 | Evans | |
| 2015/0068633 A1 | 3/2015 | Lazzara | |
| 2015/0098833 A1 | 4/2015 | Pointer et al. | |
| 2015/0140306 A1 | 5/2015 | Endo | |
| 2015/0148498 A1 | 5/2015 | Block | |
| 2015/0166830 A1 | 6/2015 | Tardy | |
| 2015/0184333 A1 | 7/2015 | Arai | |
| 2015/0191623 A1 | 7/2015 | Kaneiwa | |
| 2015/0204476 A1 | 7/2015 | Lazzara | |
| 2015/0247025 A1 | 9/2015 | Ichikawa | |
| 2015/0299941 A1 | 10/2015 | Lazzara | |
| 2015/0321448 A1 | 11/2015 | Lazzara | |

(56) References Cited

U.S. PATENT DOCUMENTS

2015/0345140 A1    12/2015    Karle
2016/0320156 A1    11/2016    Curliss et al.

FOREIGN PATENT DOCUMENTS

| EP | 2 196 497 | 6/2010 |
| WO | WO 92/17331 | 10/1992 |
| WO | WO 2012/010276 | 1/2012 |

OTHER PUBLICATIONS

Written Opinion for International Application No. PCT/US16/14115 dated Apr. 29, 2016, 24 pages.
Lenoe, E.M., "Effect of Voids on Mechanical Properties of Graphite Fiber Composites," prepared by AVCO Corporation, prepared for the U.S. Naval Air Systems Command, Contract No. N00019-07-C-0242, 1970, 55 pages.
Suhot, M.A. et al., The Effect of Voids on the Flexural Fatigue Performance of Unidirectional Carbon Fibre Composites, 16th International Conference on Composite Materials, 2007, 10 pages.
Rueda, S.H., "Curing, Defects and Mechanical Performance of Fiber-Reinforced Composites," Universidad Politecnica De Madrid, Escuela Tecnica Superior de Ingenieros de Caminos, Canales y Puertos, Apr. 2013, 198 pages.
Solar-Wrap, UV-Curable Composite Repair System, Specification Sheet, Neptunre Research, Inc., available prior to Sep. 2013, 1 page.
Syntho-Glass XT, Extreme Strength Fiberglass Composite System, Specification Sheet, Neptune Research, Inc., available prior to Sep. 2013, 2 pages.
Syntho-Glass, Fiberglass Water-Activated Composite Solution, Specification Sheet, Neptune Research, Inc., available prior to Sep. 2013, 2 pages.
Syntho-Glass NP, Non-Pressure Leak Repair Kit, Specification Sheet, Neptune Research, Inc., available prior to Sep. 2013, 1 page.
Syntho-Poxy HC—Two-Part Epoxy Compound, Specification Sheet, Neptune Research, Inc., available prior to Sep. 2013, 1 page.
Thermo Wrap CF, Carbon Fiber Composite Repair System for High Temperature and Process Piping, Specification Sheet, Neptune Research, Inc., available prior to Sep. 2013, 1 page.
Thermo Wrap, Composite Repair System for High Temperature and Process Piping, Specification Sheet, Neptune Research, Inc., available prior to Sep. 2013, 1 page.
Titan 118, Carbon Fiber Structural Repair System, Specification Sheet date prior to Sep. 2014, 1 page.
Titan 218, Carbon Fiber Structural Repair System, Specification Sheet, Neptune Research, Inc., available prior to Sep. 2013, 1 page.
Titan Saturant Epoxy, Specification Sheet, Neptune Research, Inc., available prior to Sep. 2013, 1 page.
Trans-Wrap, Carbon Fiber Pipeline Repair System, Specification Sheet, Neptune Research, Inc., available prior to Sep. 2013, 1 page.
Viper Skin, Carbon Fiber Composite Reinforcement System, Specification Sheet, Neptune Research, Inc., available prior to Sep. 2013, 2 pages.
Syntho-Glass 24, Pipe Wrap and Pipeline Repair Product, Specification Sheet, Neptune Research, Inc., available prior to Sep. 2013, 1 page.
International Search Report for International Application No. PCT/US15/12522 dated May 4, 2015, 4 pages.
Written Opinion for International Application No. PCT/US15/12522 dated May 4, 2015, 8 pages.

\* cited by examiner

CARRIERS FOR COMPOSITE REINFORCEMENT SYSTEMS AND METHODS OF USE

CROSS-REFERENCE TO RELATED APPLICATIONS

The present application claims the benefit of earlier filed U.S. Provisional Application No. 62/106,629, filed Jan. 22, 2015, entitled, "COMPOSITE REINFORCEMENT SYSTEMS INCLUDING ALIPHATIC RESINS," and U.S. Provisional Application No. 62/195,560, filed Jul. 22, 2015, entitled, "COMPOSITE REINFORCEMENT SYSTEMS AND METHODS OF MANUFACTURING THE SAME," each of which is hereby incorporated by reference herein in its entirety.

TECHNICAL FIELD

The present invention relates to composite reinforcement systems for the reinforcement of physical structures, and associated methods of use. More particularly, the invention relates to a carrier for a composite reinforcement system, and a method of reinforcing a physical structure with the composite reinforcement system.

BACKGROUND

Physical structures deteriorate over time as a result of natural causes (e.g., wind, rain, snow, temperature changes, humidity, etc.), suffer damage as a result of accidents or normal use, and may initially be formed with deficiencies or flaws that go un-detected until after deployment and/or use. Further, certain physical structures are covered by laws and/or regulations that define rules, constraints, and/or parameters within which the structures must comply, and such laws and/or regulations may change over time. These physical structures are an important aspect of a modern society and the proper manufacturing and maintenance of the structures is important to maintaining such a modern society.

As one example of the foregoing structures, conduit assemblies, such as pipelines and hydraulic circuits, are used to transport an assortment of fluids, such as water, oil, various natural and synthetic gases, sewage, slurries, hazardous materials, and the like. Conduit assemblies are formed from a variety of materials, including, for example, concrete, plastic (e.g., polyvinyl chloride, polyethylene), and various metallic materials, such as iron, copper, and steel. As another example of the foregoing structures, containment structures, such as storage tanks, are used to store an assortment of materials, such as solids and fluids, including oil, water, chemicals, various natural and synthetic fluids, sewage, hazardous materials, food, and the like. Containment structures are formed from a variety of materials, including concrete, plastic, and metallic materials, such as iron, copper, aluminum, and steel. As another example of the foregoing structures, load bearing structures, such as beams and concrete columns or pillars, form and/or support various buildings, bridges, and highway structures. Load bearing structures are constructed from various construction materials, such as wood, reinforced concrete, unreinforced concrete, aluminum, iron, steel, and the like.

To repair and/or maintain the foregoing structures, or to modify such structures to comply with new or updated laws and/or regulations, there is a need for improved repair and/or reinforcement systems that are quick, versatile, durable, minimally disruptive, and cost-effective, in all aspects of the manufacturing and application of the systems in the field.

SUMMARY

According to one aspect of the present disclosure, a carrier of a composite reinforcement system for repairing and/or reinforcing a physical structure is disclosed. The carrier includes a plurality of carbon fibers. Each carbon fiber has a longitudinal axis and a length extending in a generally 0 degree direction. The carrier further includes at least one fiberglass fiber having a longitudinal axis and a length extending in a generally 90 degree direction across the plurality of carbon fibers. The plurality of carbon fibers constitute at least about 70 weight percent (wt %) of the carrier, and the at least one fiberglass fiber constitutes at most about 30 wt % of the carrier.

A further aspect of the present disclosure includes a composite reinforcement system for repairing and/or reinforcing a physical structure. The system includes a carrier that includes a plurality of carbon fibers extending in a generally 0 degree direction, and a plurality of fiberglass fibers extending in a generally 90 degree direction across the plurality of carbon fibers. The plurality of carbon fibers constitute at least about 70 wt % of the carrier, and the plurality of fiberglass fibers constitute at most about 30 wt % of the carrier. The system further includes a resin system that includes a first resin component and a second resin component. The first resin component and the second resin component are configured to harden upon being mixed together. The resin system is configured to impregnate the carrier and harden after mixing the first resin component with the second resin component and applying the resin system to the carrier.

A further aspect of the present disclosure is a method of reinforcing a physical structure. The method includes removing a carrier from a container. The carrier includes a plurality of carbon fibers extending in a generally 0 degree direction and a plurality of fiberglass fibers extending in a generally 90 degree direction across the plurality of carbon fibers. The plurality of carbon fibers constitute at least about 70 wt % of the carrier and the plurality of fiberglass fibers constitute at most about 30 wt % of the carrier. The method further includes mixing at least two components of a resin system together to form a resin, applying the resin to the carrier to impregnate the resin within the carrier, and applying the impregnated carrier to the physical structure. The method further includes allowing the resin impregnated within the carrier to harden with the carrier on the physical structure to reinforce the physical structure.

These and other capabilities of the inventions, along with the inventions themselves, will be more fully understood after a review of the following figures, detailed description, and claims.

Figure 1A:
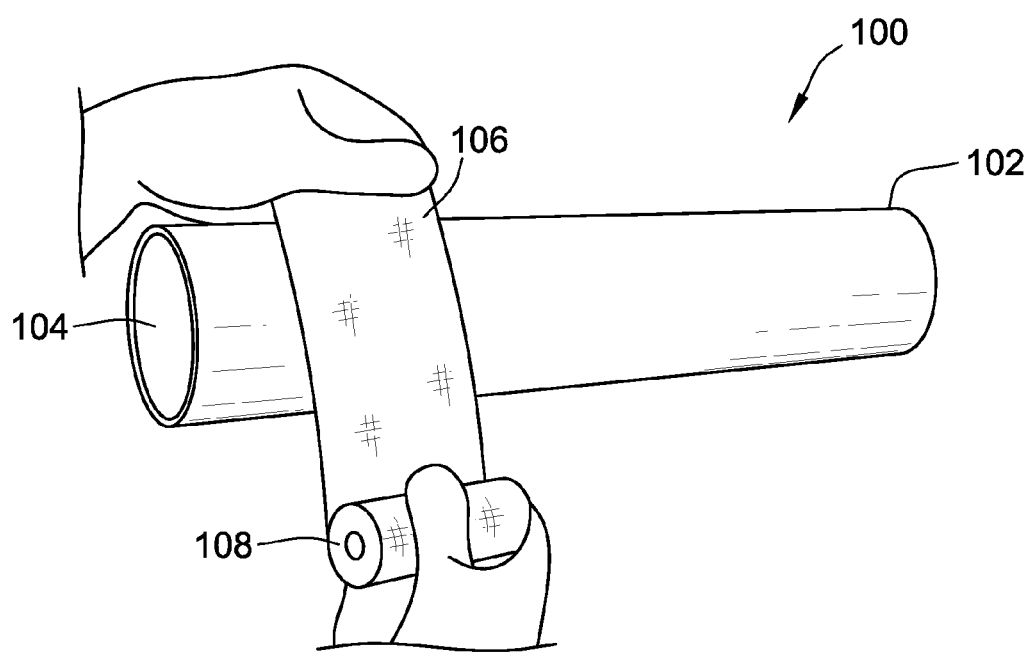
FIG. 1A shows a perspective view of the application of a composite reinforcement system to a physical structure to be reinforced, at an initial application of the composite reinforcement system, in accord with aspects of the present disclosure.

While the inventions are susceptible to various modifications and alternative forms, specific embodiments have been shown by way of example in the drawings and will be described in detail herein. It should be understood, however, that the inventions are not intended to be limited to the particular forms disclosed. Rather, the inventions are to cover all modifications, equivalents, and alternatives falling within the spirit and scope of the inventions as defined by the appended claims.

DETAILED DESCRIPTION

While the inventions are susceptible of embodiment in many different forms, there is shown in the drawings and will herein be described in detail preferred embodiments of the inventions with the understanding that the present disclosure is to be considered as an exemplification of the principles of the inventions and is not intended to limit the broad aspect of the inventions to the embodiments illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

The present disclosure is directed to carriers for use in composite reinforcement systems. The present disclosure also is directed to composite reinforcement systems that include one or more carriers that are impregnated or saturated with one or more resins that harden while on or wrapped around a physical structure to strengthen, repair, and/or reinforce the physical structure. The present disclosure also is directed to one or more methods for forming one or more carriers for composite reinforcement systems.

The carriers of the present disclosure and, in turn, the related composite reinforcement systems, can be used to improve mechanical properties, chemical properties, versatility, user-friendliness, and consistency of physical structures, among other qualities and/or performance features. An exemplary composite reinforcement system of the present disclosure includes a carrier that is impregnated with a resin so that the initially flexible carrier hardens upon the hardening of the resin. The resin can be one of various different types of resins. In some aspects, the resin is an epoxy resin. The composite reinforcement system of the carrier impregnated with a resin, such as, but not limited to, an epoxy resin, can be used to repair or reinforce physical structures, such as containment systems, pipelines, and conveyance systems, and load bearing structures, such as columns and beams, to name but a few examples of such physical structures.

The carrier for a composite reinforcement system of the present disclosure can be formed of woven fibers and/or non-woven fibers. Woven fibers include fibers that are interconnected to form mechanical connections, such as in the examples of woven or knitted fabrics, or non-woven fabrics where the fibers are still entangled (e.g., interconnected). Other mechanical connections of woven fibers can include, for example, braided fibers, twisted or spun fibers (e.g., a plurality of small-diameter fibers twisted together), stitched fibers, or cross-stitched fibers, to name a few examples.

Non-woven fibers include a plurality of generally parallel uni-directional fibers that are not mechanically connected through direct mechanical connections of the fibers themselves. Rather, a carrier formed of a plurality of uni-directional fibers can be held together or adhered (e.g., connected, bonded, etc.) through the stickiness and/or hardening of a material applied to the plurality of fibers, with no mechanical connection (e.g., stitching, weaving, spinning, frictional connection, other type of mechanical fastening) between the individual fibers. In other aspects, the uni-directional fibers of a non-woven carrier can be connected, for example, through a hot melted fiber stitched axially and heated to connect the uni-directional fibers to keep them in place, but with the uni-directional fibers themselves not directly mechanically connected.

Some non-limiting examples of fibers that can be used for the composite reinforcement systems of the present disclosure include carbon fibers (both polyacrylonitrile (PAN) and pitch based), glass fibers (e.g., fiberglass), basalt fibers, aramid fibers, metal fibers, and/or combinations thereof. Other non-limiting exemplary aspects of carriers contemplated for the composite reinforcement systems disclosed herein include the fiber-based materials for composite reinforcement systems described in U.S. Pat. No. 4,519,856, issued May 28, 1985, entitled, "Resin-Cloth Structural System"; U.S. Pat. No. 5,030,493, issued Jul. 9, 1991, entitled, "High Strength Resin-Cloth Structural System"; U.S. Pat. No. 8,522,827, issued Sep. 3, 2013, entitled, "Protective Seal For A Pipeline Assembly"; U.S. Patent Application Publication No. 2012/156378, published Jun. 21, 2012, entitled, "Systems, Methods, and Device For Applying Fluid Composites To Carrier Sheets"; and U.S. Patent Application Publication No. 2013/0160926, published Jun. 27, 2013, entitled, "Systems, Methods, and Device For Strengthening Fluid System Components Using Radiation-Curable Composites"; the disclosures of which are each hereby incorporated by reference herein in their entireties.

In some aspects, the carrier is formed of a fiberglass material. An exemplary fiberglass composite reinforcement system preferably comprises a woven filament, fiberglass cloth. In some aspects, the carrier is formed of a carbon-fiber material. The carbon-fiber material can be PAN-based and/or pitch-based carbon fibers. In some aspects, the carrier is a bi-axial, hybrid carbon fiber and fiberglass composite material. Such a bi-axial carbon fiber and fiberglass material may have carbon fibers and fiberglass extending the same direction or varying directions. In some aspects, a bi-axial carbon fiber and fiberglass material may be formed of the same weight percent of carbon fiber and fiberglass, or varying wt % of carbon fiber and fiberglass. In some aspects, the carrier is a carbon fiber composite material, such as uni-directional or bi-directional non-woven carbon-fiber composite or glass-fiber composite materials. In some aspects, the carrier is a bi-directional, woven fiberglass tape composite material. In some aspects, the carrier includes carbon fibers. In some aspects, the carrier includes glass fibers. In some aspects, the carrier includes basalt fibers. In some aspects, the carrier includes aramid fibers. In some aspects, the carrier includes liquid crystalline polyester fibers. In some aspects, the carrier includes metal fibers. In some aspects, the carrier includes combinations of any of the fibers disclosed herein. In some aspects, the carrier includes fabric- or fiber-based materials, such as those described in U.S. Pat. No. 4,519,856, issued May 28, 1985, entitled, "Resin-Cloth Structural System"; U.S. Pat. No. 5,030,493, issued Jul. 9, 1991, entitled, "High Strength Resin-Cloth Structural System"; U.S. Pat. No. 8,522,827, issued Sep. 3, 2013, entitled, "Protective Seal For A Pipeline Assembly"; U.S. Patent Application Publication No. 2012/156378, published Jun. 21, 2012, entitled, "Systems, Methods, and Device For Applying Fluid Composites To Carrier Sheets"; and U.S. Patent Application Publication No. 2013/0160926, published Jun. 27, 2013, entitled, "Systems, Methods, and Device For Strengthening Fluid System Components Using Radiation-Curable Composites."

The above-described carriers are impregnated with one or more resins that harden to form a hardened composite reinforcement system. As described above, the one or more resins can include an epoxy resin. An epoxy resin system includes two or more epoxy resin components that are mixed together and react to form the epoxy resin. The epoxy resin components can be various different base/hardener combinations. In some aspects, the epoxy resin components can be a low viscosity resin base that is mixed with a fast curing resin hardener to form the resulting epoxy resin. The initial low viscosity aids the impregnation or saturation of the epoxy resin components within the carrier. According to one particular commercial embodiment, the epoxy resin can be formed of Pro-Set Inc.'s LAM-125 resin base and LAM-224 resin hardener for an initially low viscosity and fast-curing epoxy resin. Alternatively, the epoxy resin can be formed of EPDXAMITE® 100 base and EPDXAMITE® 102 hardener by Smooth-On Inc., the 635 Thin Epoxy Resin System by US Composites, Inc., the PT series of epoxy systems by Curbell Plastics, Inc., and/or the EZ-Lam Epoxy System by ACP Composites, Inc., to name a few. However, various other epoxy resins can be used without departing from the spirit and scope of the present disclosure. Moreover, although primarily described herein as being used with epoxy resins, the carriers disclosed herein can be used with other types of resins. By way of example, and without limitation, other resins that can be used to impregnate or saturate the carriers described herein include resins based on various other chemistries, such as phenolics, vinyl esters, acrylics, unsaturated polyesters, two component polyurethanes and/or polyureas, geopolymers, silicones, amides, alkyds, thermosets, etc.

Figure 1B:
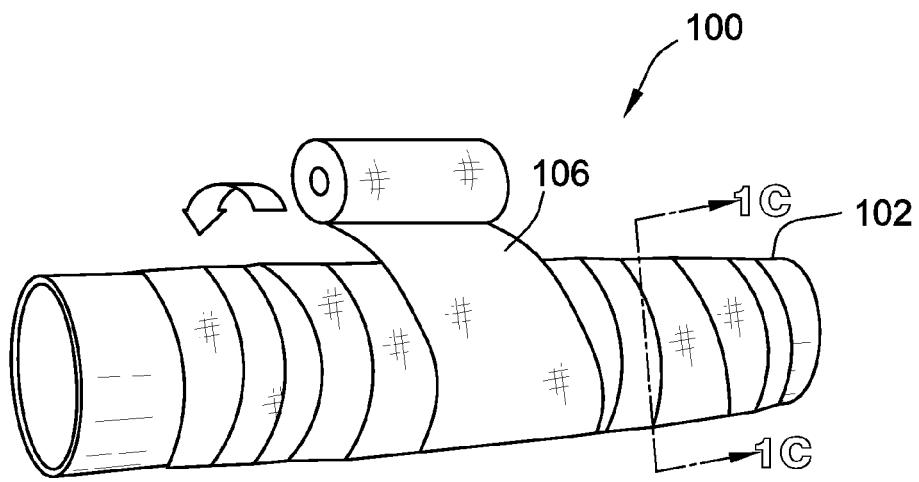
FIG. 1B shows a perspective view of the application of the composite reinforcement system of FIG. 1A, at nearly completion of the application of the composite reinforcement system, in accord with aspects of the present disclosure.
Figure 1C:
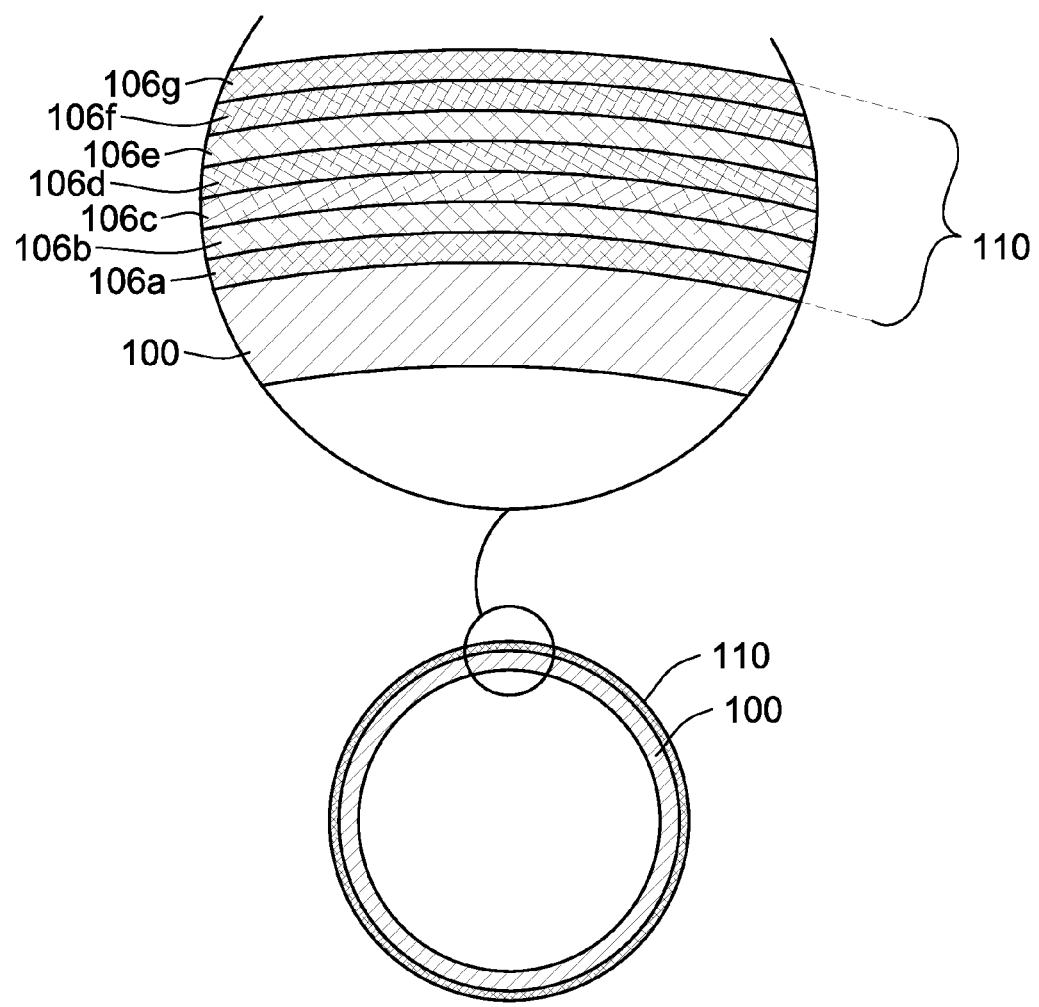
FIG. 1C shows a cross-sectional view of the physical structure and applied composite reinforcement system along the line 1C-1C in FIG. 1B, in accord with aspects of the present disclosure.
Figure 2:
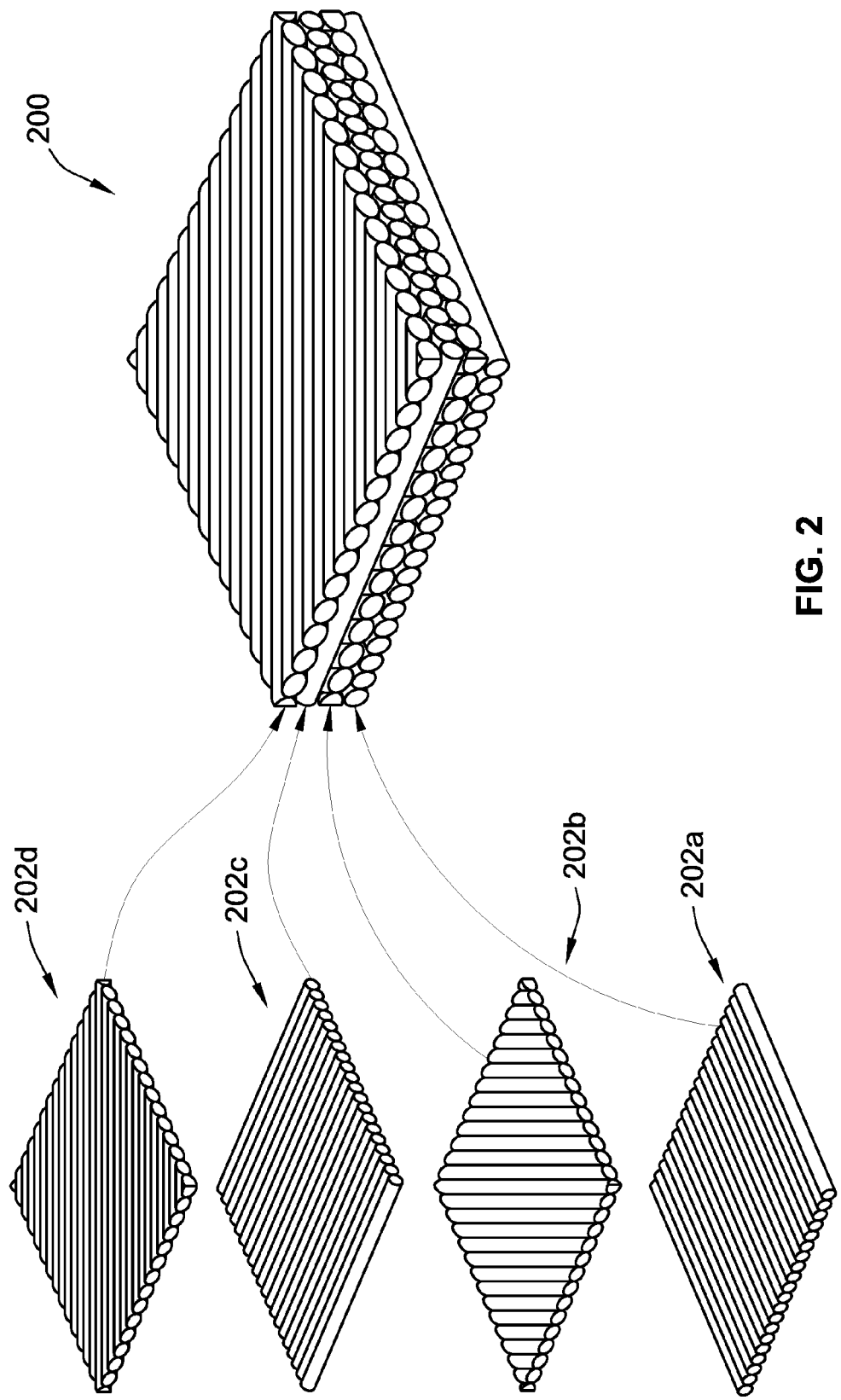
FIG. 2 shows multiple plies of a carrier of a composite reinforcement system, in accord with aspects of the present disclosure.

In some aspects, one or both of the epoxy resin components can include one or more other non-reactive components, such as one or more fillers. The one or more fillers are added to increase the hardness of the epoxy resin after curing. Such fillers include high aspect ratio materials, such as materials of a few nanometers to a few microns in size. By way of example, and without limitation, such fillers include wollastonite, halloysite, boron nitride, boron carbide, silicon carbide, tungsten carbide, aluminum oxide, chopped glass, fumed silica, and carbon nanotubes or carbon-fiber-based fillers, such as chopped carbon fibers, carbon nanotubes, and graphene, among other types of fillers. By way of some additional examples, specific commercial embodiments include EPOCYL™ 128-02, which is a liquid bisphenol-A (bis-A) epoxy resin containing a high concentration of carbon nanotubes; DRAGONITE-XR™, which is a halloysite clay; NANOMER® I.28E, which is a modified montmorillonite mineral; SI-TUFF™ by Advanced Composite Materials, LLC, which is formed of silicon carbide; NYGLOS® 4W, which is a wollastonite-based filler; and W-610 ceramic microspheres made by 3M®. However, various other fillers can be used beyond the ones specifically mentioned herein without departing from the spirit and scope of the present disclosure. Referring now to the drawings, FIGS. 1A-1C illustrate various views of an exemplary composite reinforcement system applied to a physical structure, in accord with aspects of the present disclosure. FIG. 2 shows multiple plies of a carrier of a composite reinforcement system, particularly the carrier of FIGS. 1A-1C, in accord with aspects of the present disclosure.

FIG. 1A is a perspective view of an exemplary physical structure 100 showing a composite reinforcement system in an initial stage of being applied to reinforce an exterior surface of a section of the physical structure 100. Although the physical structure 100 is shown as a pipe, the present disclosure is applicable to various other physical structures. Such various other physical structures include, for example, conduit assemblies, such hydraulic circuits, containment structures, such as storage tanks, and load bearing structures, such as beams and concrete columns or pillars. Moreover, the physical structure 100 to be reinforced may be constructed of any feasible material having sufficient strength and resiliency for the intended use of the physical structure 100. By way of example, and without limitation, the physical structure 100 is fabricated from a material that can withstand significant internal and external loading, such as those that exist by reason of surrounding formations (e.g., when the physical structure 100 is buried underground), as well as any additional loads exacted thereto (e.g., due to internal fluid pressures, existing constructions, varying surface loads, etc.).

The physical structures (e.g., physical structure 100) may require reinforcement and/or repair for various different reasons. According to one reason, a physical structure may require reinforcement and/or repair based on flaws within the structure. Such flaws may be the result of production flaws, such as the separation of two laminated layers, cracks, dents, gouges, wrinkles, or combinations thereof formed within the initial materials used to form the physical structures. Such flaws may also be the result of other types of manufacturing flaws, such as flaws within material used to fasten two elements of the physical structure together, such as welding related flaws. The welding related flaws may be, for example, lack of penetration of the weld, lack of fusion within the weld, and/or porosity of the resulting weld. Such flaws may also be the result of incorrect materials being used during the construction of a physical structure. For example, a faulty material selection and/or inadvertent or incorrect substitution of materials may lead to flaws within the final physical structure that request reinforcement.

According to another reason for reinforcement or repair, physical structures deteriorate over time as a result of various factors (e.g., wind, rain, snow, temperature changes, humidity, corrosion, erosion, etc.). For example, metallic physical structures can suffer from general metal loss due to corrosion and/or erosion. Certain areas of metallic physical structures may suffer from greater erosion and/or corrosion, or may have areas with specific corrosion and/or erosion rates. Metallic structures may also have localized metal loss due to corrosion and/or erosion, such as corrosion under insulation (CUI), pitting, and selective corrosion. Deterioration also results in cracking, such as surface cracks (e.g., stress corrosion cracking (SCC)). The composite reinforcement structures disclosed herein can be used to reinforce and/or repair the deterioration of the physical structures over time.

As discussed above, certain structures are covered by laws and/or regulations that define rules, constraints, and/or parameters within which the physical structures must comply. Alternatively, or in addition, certain physical structure previously not covered by laws and/or regulations may subsequently be covered to address increased performance of the physical structures. For example, physical structures may be associated with classification factor changes. With respect to roadways, the roadways may be associated with road crossing reinforcements. The composite reinforcement structures disclosed herein can be used to have existing physical structures comply with changes in the laws and regulations applying to such structures.

Steel is one example of a specific material that is commonly found in physical structures. Despite its strength and resilience, steel physical structures may require reinforcement and/or repair. For example, steel physical structures in the form of load bearing and/or support structures, such as beams, trusses, tanks, decks, hulls, towers, and poles, may require reinforcement and/or repair for any one or more of the reasons discussed above. In certain applications, the performance of a steel physical structure may be required to be improved without replacing the physical structure, such as stiffening the physical structure or increasing the load bearing capacity of the physical structure. Alternatively, a reduction in weight of a steel physical structure may be required without a corresponding loss in the performance of the steel physical structure. In one or more of these applications, the composite reinforcement systems of the present disclosure can be used to reinforce and/or repair such steel physical structures.

In the illustrated embodiment, the physical structure 100 is an elongated hollow cylinder having an exterior surface 102 and an interior surface 104 that may be reinforced or repaired with a composite reinforcement system of the present disclosure. The physical structure 100 can be made of any metallic, ceramic, and/or polymeric materials, such as steel, iron, concrete, cement, polyvinyl chloride (PVC), etc. Moreover, although illustrated as a cylindrical physical structure, the physical structure 100 may take on other shapes and/or geometric cross-sections that allow for the application of a composite reinforcement system to a physical structure without departing from aspects of the present disclosure. Additional structures and geometries that the described composite reinforcement system may be applied to include steel columns (e.g., flange, hollow tube, hollow square, hollow rectangular cross-sections, etc.); concrete columns (e.g., circular, oval, square, rectangular cross-sections, etc.); concrete or steel beams; other load bearing structures made of steel, wood, or concrete (e.g., bridges, pipelines, channels, etc.); storage tanks; concrete walls; and/or concrete slabs. References to concrete structures include both reinforced and unreinforced concrete structures.

The composite reinforcement system includes a carrier 106 that is impregnated or saturated with a resin, as described herein, for the reinforcement or repair of the physical structure 100. The carrier 106 may be impregnated or saturated with the resin in the field or may be impregnated or saturated with the resin, or a homogenous blend of reagents that form the resin, prior to being in the field, such as in a manufacturing facility of the carrier 106. For example, a pre-impregnated carrier may be stored within a package as a prepreg that is then applied to the physical structure 100 in the field. Alternatively, the carrier 106 may be packaged without being impregnated with a resin and may be subsequently impregnated with the resin in the field. By way of example, and without limitation, field-mixed epoxy resin components are applied to the carrier 106 by roller, brush, spray or other mechanical device. Additionally, or in the alternative, the carrier may be coated with an epoxy resin as described in U.S. Pat. No. 8,844,464, issued Sep. 30, 2014, and entitled "SYSTEMS, METHODS, AND DEVICES FOR APPLYING FLUID COMPOSITES TO A CARRIER SHEET," the disclosure of which is hereby incorporated by reference herein in its entirety.

For both pre-impregnation and field-impregnation, the carrier 106 may be in the form of a roll 108. However, the carrier 106 may be in an alternative form, such as multiple different layers stacked upon each other, a large towel or pad, etc. Moreover, the carrier 106 in the form of a roll 108 may initially be within an enclosure, such as a wrapper, a package, etc. The carrier 106 in the form of the roll 108 is initially applied to the physical structure 100 by applying a first end of the roll 108 to the physical structure 100, as illustrated in FIG. 1A. Then, the roll 108 is wrapped around the physical structure 100 such that a series of multiple thin layers of the carrier 106 are applied about the physical structure 100 (e.g., about the exterior surface 102 and/or the interior surface 104). The carrier 106 can be impregnated with various different amounts of the resin, such as an epoxy resin, depending on, for example, the specifics of the intended use of the resulting composite reinforcement system. In some aspects, the resulting impregnated carrier is between about 40 to 60 wt % carrier and about 60 to 40 wt % resin, such as an epoxy resin. In some specific aspects, the resulting impregnated carrier is between about 50 wt % carrier and about 50 wt % resin.

A nearly finished application of a composite reinforcement system with the last outermost exposed layers of the carrier 106 is illustrated in FIG. 1B, with a cross-section through the physical structure 100 along the line 1C-1C in FIG. 1B illustrated in FIG. 1C. As shown in the exploded view of FIG. 1C, overlapping carrier layers 106a-106g of the carrier 106 applied to the physical structure 100 form a multilayered structure 110. Each of the overlapping carrier layers 106a-106g has a generally uniform thickness. In some embodiments, the thickness of each carrier layer 106a-106g increases by less than 10% during curing of the resin. Preferably, the thickness of each carrier layer 106a-106g increases less than 5% during curing of the resin. More preferably, the thickness of each layer 106a-106g increases less than 1% during curing of the resin.

In some embodiments, and depending on, for example, the resin that is used to impregnate or saturate the carrier 106, a material to initiate or aid curing is applied to the surface of the physical structure 100 (e.g., the exterior surface 102 or the interior surface 104). For example, the physical structure 100 may be wetted with the hardener of the epoxy resin components to further aid in curing of the resin when the first layer of the carrier 106 (e.g., carrier layer 106a) contacts the wetted surface. The carrier 106 is then applied to the physical structure 100 in layers (e.g., layers 106b-106g) as described above, but the material to initiate or aid in curing can be generally applied to the outer portion of each layer prior to the application of the next layer of the composite reinforcement system.

FIG. 2 illustrates a multi-ply carrier 200 for reinforcing physical structures as part of a composite reinforcement system, in accord with aspects of the present concepts. The carrier 200 includes four layers 202a-202d of uni-directional fibers, such as uni-directional carbon fibers or fiberglass fibers. As shown, the layer 202a includes the uni-directional fibers extending in a first direction generally (e.g., left to right in the perspective shown in FIG. 2). The layer 202b immediately above and touching the layer 202a includes the uni-directional fibers extending in a direction rotated 45 degrees counterclockwise relative to the view in FIG. 2 and with respect to the direction of the uni-directional fibers of layer 202a. The same pattern is repeated for each additional layer added above layers 202a and 202b. Namely, the layer 202c immediately above and touching the layer 202b includes the uni-directional fibers extending in a direction rotated 45 degrees counterclockwise relative to the view in FIG. 2 and with respect the direction of the uni-directional fibers of layer 202b. The layer 202d immediately above and touching the layer 202c includes the uni-directional fibers extending in a direction rotated 45 degrees counterclockwise relative to the view in FIG. 2 and with respect the direction of the uni-directional fibers of layer 202c.

Figure 3A:
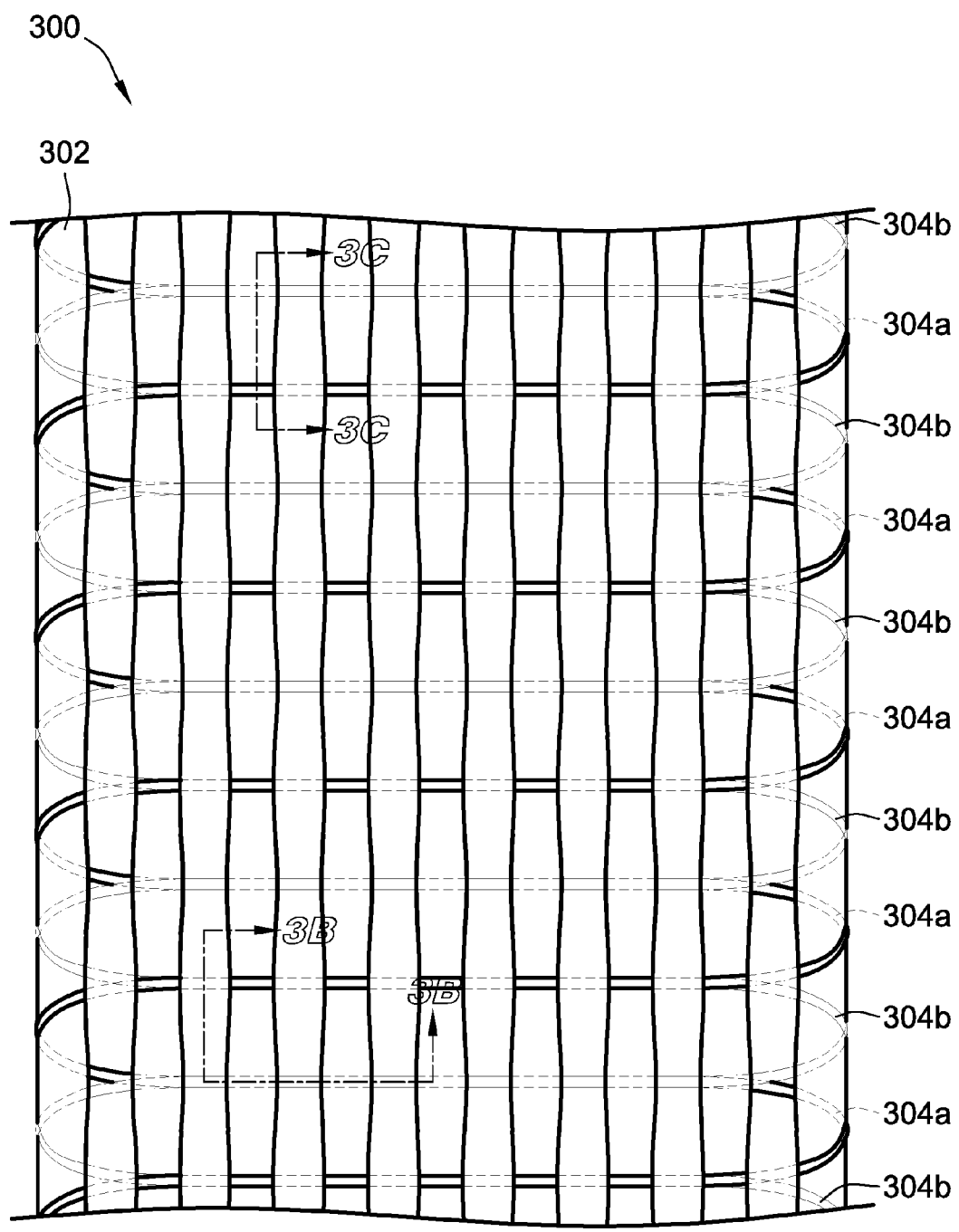
FIG. 3A shows a plan view of an additional carrier of a composite reinforcement system, in accord with aspects of the present disclosure.

FIG. 3A illustrates an alternative carrier 300 for reinforcing physical structures as part of a composite reinforcement system, in accord with aspects of the present concepts. The carrier 300 is a bi-axial, carbon fiber and fiberglass composite material. Specifically, the carrier 300 is formed of carbon fibers 302 that extend generally in the 0 degree direction and fiberglass fibers 304a, 304b that extend generally in the 90 degree direction, within the plane and perpendicular to the carbon fibers 302. In some aspects, the 0 degree direction is relative to the warp or length of the carrier 300, such as being the longest dimension of the carrier 300, and the 90 degree direction is relative to the weft or width of the carrier 300. In alternative aspects, the 0 degree and 90 degree directions are unrelated to the dimensions of the carrier 300 and are instead merely to identify the relationship between the orientation of the carbon fibers and the fiberglass fibers. For example, a carrier within a composite reinforcement system may be cut from the carrier 300 according to various shapes and/or sizes and subsequently packaged, such that the carrier 300 is stock material, and the directions in which the carbon fibers 302 and fiberglass fibers extend 304a, 304b (e.g., 0 degrees and 90 degrees) may vary relative to the length and width of the carrier 300.

As shown, the fiberglass fibers 304a, 304b are interlaced with the carbon fibers 302 along a length of the carrier 300. The fiberglass fibers 304a, 304b substantially overlap vertically as the fiberglass fibers 304a, 304b cross the plurality of carbon fibers 302 along the length of the carrier. At the edges of the carrier 300, the fiberglass fibers 304a, 304b loop over the outermost carbon fibers 302. However, one or more carriers may be cut from the carrier 300 such that the edges of the resulting carrier do not include fiberglass fibers 304a, 304b looping over the outmost carbon fibers 302. For example, the carrier 300 in FIG. 3A may be an initial stock material from which carriers used in composite reinforcement systems are cut from.

In addition to the orientation of carbon fibers 302 extending generally in the 0 degree direction and the orientation of the fiberglass fibers extending generally in the 90 degree direction, the fiber distribution is at least about 70 wt % in the 0 degree direction and at most about 30 wt % in the 90 degree direction. In some aspects, the fiber distribution is about 80 wt % in the 0 degree direction and about 20 wt % in the 90 degree direction. In some aspects, the fiber distribution is about 85 wt % in the 0 degree direction and about 15 wt % in the 90 degree direction. In some aspects, the fiber distribution is about 90 wt % in the 0 degree direction and about 10 wt % in the 90 degree direction. In some aspects, the fiber distribution is about 95 wt % in the 0 degree direction and about 5 wt % in the 90 degree direction. In some aspects, the fiber distribution is about 97 wt % in the 0 degree direction and about 3 wt % in the 90 degree direction. In some aspects, the fiber distribution is about 99 wt % in the 0 degree direction and about 1 wt % in the 90 degree direction. The resulting carrier 300 has a weight of about 500 to about 610 grams per square meter. According to a specific example, the carrier 300 being formed three feet long and one foot wide has a weight of about 5 to about 6 ounces.

According to the above distribution of the carbon fibers 302 and the fiberglass fibers 304a, 304b, the resulting carrier 300 maintains its shape while maximizing the tensile strength of the carbon fibers 302. Specifically, carbon fibers lose tensile strength when woven because of the bending of the carbon fibers during the weaving process. Therefore, carriers that have only uni-directional carbon fibers in the 0 degree direction theoretically have higher tensile strengths. However, during field application of such carriers, the uni-directional carbon fibers, which may be held together only by the stickiness of the impregnated resin, tend to separate during application on various physical structures. Thus, cross weaving using various materials may be useful in holding the uni-directional fibers together. However, the cross-woven fibers lower the tensile strength. It was found that the above-recited distributions of carbon fiber and fiberglass, and particularly the distribution of 95 wt % of the carbon fibers 302 in the 0 degree orientation, in combination with 5 wt % of the fiberglass fibers 304a, 304b in the 90 degree orientation, provide the highest tensile strengths. It is believed, although without being limited by theory, that the uni-directional carbon fibers may move during application. The movement may result in weaknesses in the final product because of the voids caused by the separation of the uni-directional carbon fibers. Thus, the 5 wt % of the fiberglass fibers in the 90 degree direction physically hold the carbon fibers 302 together during application while minimizing the loss in the final tensile strength of the product. Thus, it is believed that the 5 wt % of the fiberglass fibers in the 90 degree direction is the minimum amount of fiberglass fibers needed to maintain the position and arrangement of the carbon fibers 302.

Figure 3B:
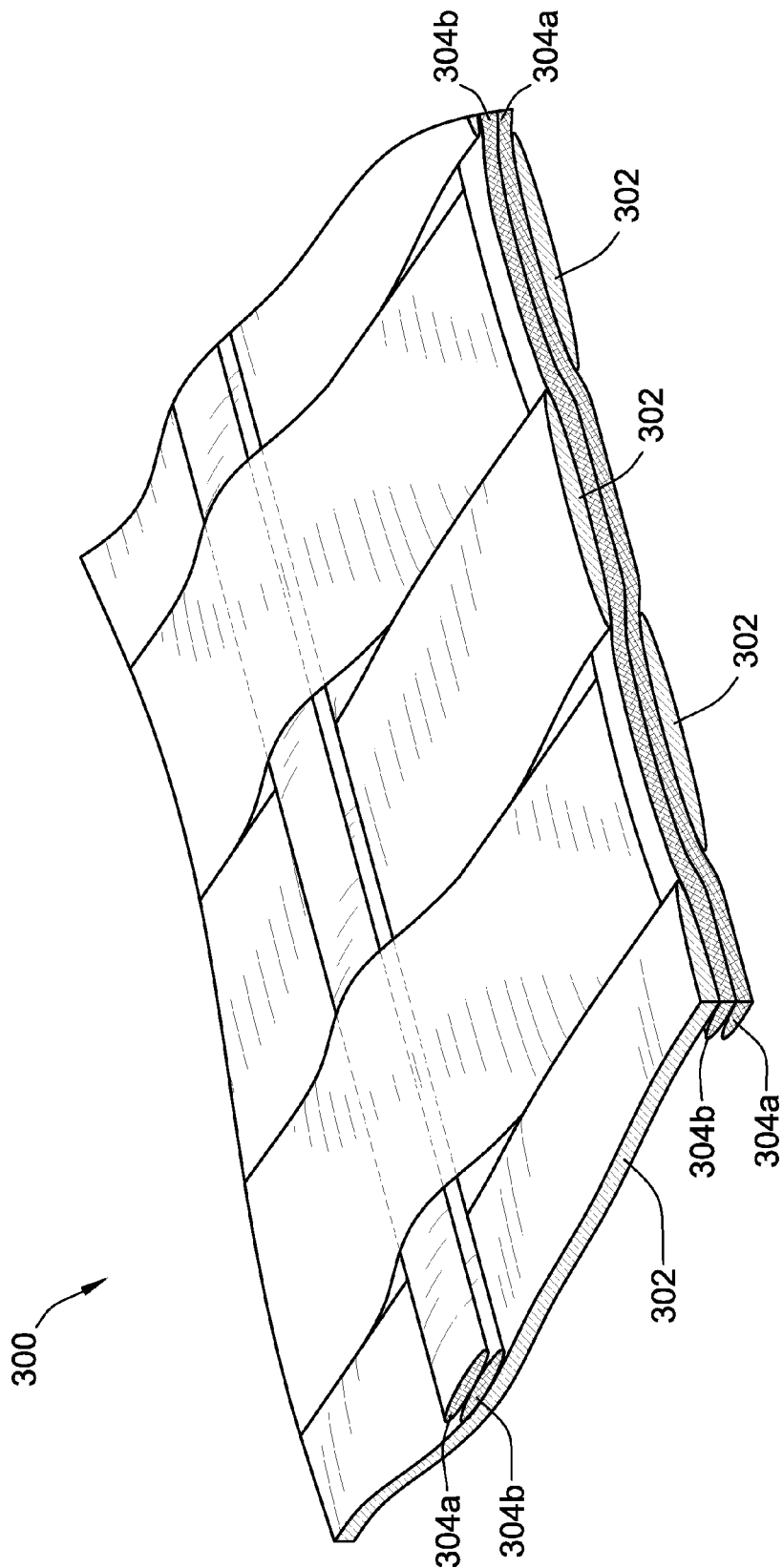
FIG. 3B shows a cut-out perspective view of the carrier of FIG. 3A along the line 3B-3B in FIG. 3A, in accord with aspects of the present disclosure.
Figure 3C:
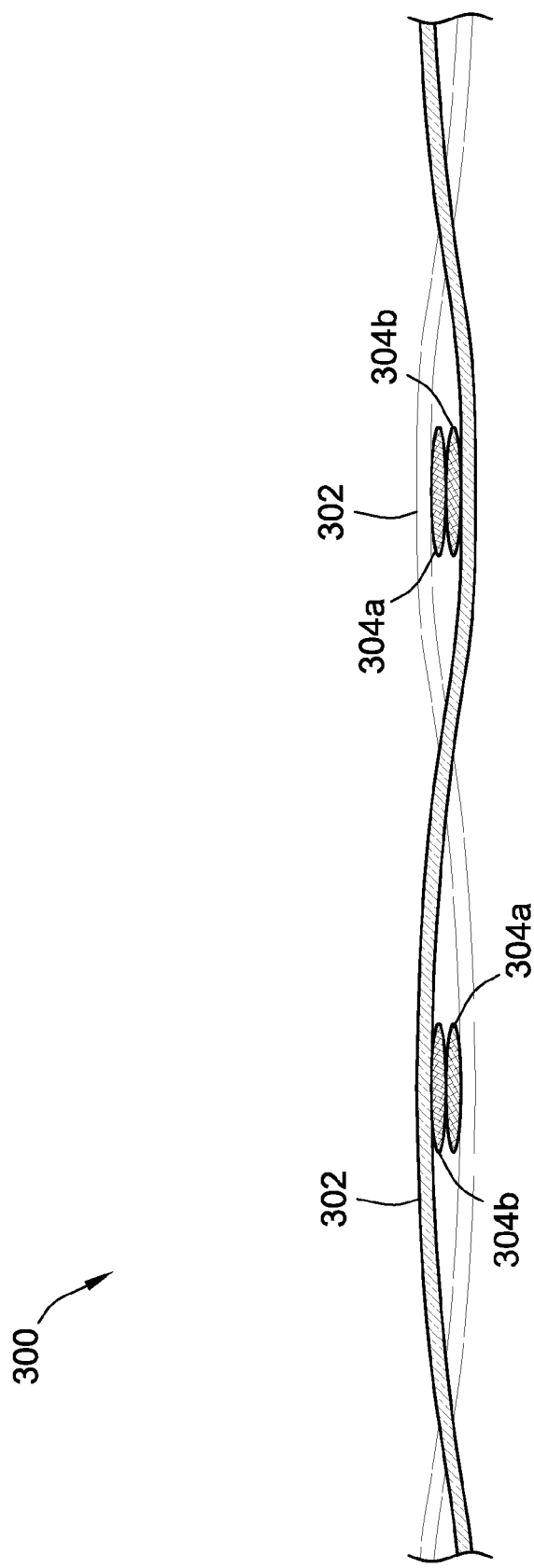
FIG. 3C shows a cross-sectional view of the carrier of FIG. 3A along the line 3C-3C in FIG. 3A, in accord with aspects of the present disclosure.

Referring to FIGS. 3B and 3C, FIG. 3B shows a cut-out perspective view of the carrier of FIG. 3A along the line 3B-3B, and FIG. 3C shows a cross-sectional view of the carrier of FIG. 3A along the line 3C-3C, in accord with aspects of the present disclosure. As shown, the fiberglass fibers 304a, 304b are woven between the carbon fibers 302 such that the fiberglass fibers 304a, 304b alternatingly cross over and under the carbon fibers 302 as the fiberglass fibers 304a, 304b extend across the carrier 300. However, the particular weave of the carrier 300 may vary without departing from the spirit and scope of the present disclosure. For example, the fiberglass fibers 304a, 304b may alternatingly cross over and under every two or more carbon fibers 302 as the fiberglass fibers 304a, 304b extend across the carrier 300. Further, although the carrier 300 is described as the fiberglass fibers 304a, 304b alternatingly crossing over and under the carbon fibers 302, instead the carrier 300 may be considered as the carbon fibers 302 crossing over and under the fiberglass fibers 304a, 304b.

As shown in FIGS. 3A-3C, there are two fiberglass fibers 304a and 304b. In some aspects, the fiberglass fibers 304a, 304b are woven between the carbon fibers 302 with each fiberglass fiber 304a, 304b alternating as the top fiberglass fiber. For example, as shown in FIG. 3B, fiberglass fiber 304b is initially above fiberglass fiber 304a, as shown in the lower right cross-sectional portion, as the fiberglass fibers 304a, 304b extend across the carrier 300. In the subsequent weave of the fiberglass fibers 304a, 304b through the carbon fibers 302, fiberglass fiber 304a is above fiberglass fiber 304b. The pattern of alternating top fiberglass fibers continues through the carrier 300. However, alternatively, the same fiberglass fiber 304a or 304b may be the top fiberglass fiber throughout the carrier 300. Further, although FIGS. 3A-3C show two fiberglass fibers 304a, 304b, the carrier 300 may instead include one or more fiberglass fibers, such as only one fiberglass fiber that is woven through the carrier 300, or three or more fiberglass fibers that are woven through the carrier 300.

The fiberglass fibers 304a, 304b may be conventional fiberglass fibers. However, the weight, the strength, the modulus, and/or the density of the fiberglass fibers 304a, 304b may vary depending the specific use and/or physical structure to be repaired or replaced.

The carbon fibers 302 may be PAN and pitch-based carbon fibers. Further, the carbon fibers 302 may be, for example, about 5,000 to about 50,000 carbon fiber tows. In some aspects, the carbon fibers 302 are formed of a 3,000 carbon fiber tow, a 6,000 carbon fiber tow, a 9,000 carbon fiber tow, a 12,000 carbon fiber tow, a 16,000 carbon fiber tow, a 20,000 carbon fiber tow, a 30,000 carbon fiber tow, or a 50,000 carbon fiber tow. In some aspects, a larger carbon fiber to is desired for the carbon fibers 302 to produce a thicker carrier for repairing and/or reinforcing a physical structure, such as to more closely match the thickness of the physical structure. In some aspects, each of the carbon fibers 302 within the carrier 300 are the same type (e.g., PAN versus pitch) and the same weight and/or thickness (e.g., tow). Alternatively, the carbon fibers 302 within the carrier 300 may vary such that the carbon fibers 302 are different types and/or weights or thicknesses.

The carbon fibers 302 may be conventional fiberglass fibers. However, the weight, the strength, the modulus, and/or the density of the carbon fibers 302 may vary depending the specific use and/or physical structure to be repaired or replaced. By way of example, each filament of the carbon fibers 302 may be about 8 μm to about 11 μm in diameter, such as about 10 μm. The tensile strength of each filament of the carbon fibers can be about 35 to about 600 thousand pounds per square inch (ksi). Moreover, the weight, the strength, the modulus, and/or the density of the carbon fibers 302 may also vary depending on the characteristics of the fiberglass fibers 304a, 304b.

The carrier 300 may be formed according to one or more conventional mechanical processes and/or methods of forming a carbon fiber and/or fiberglass carrier. In some aspects, a loom is used to weave the carbon fibers 302 with the fiberglass fibers 304a, 304b. One or more spools of the carbon fibers 302 and the fiberglass fibers 304a, 304b feed the fibers to a creel and into the loom. The fibers are then fed into the loom and are woven together to form the resulting carrier 300 as described above.

However, in some aspects, weaving of the carrier 300 may vary relative to conventional processes and/or methods. For example, the distance of the creel to the loom may be varied to prevent and/or reduce breakage of the fibers prior to being woven into the carrier 300. A threshold distance between the creel and the loom during formation of the carrier 300 allows for some slack in the fiber. Slack resulting in a sag or downward bowing of the fibers of about 0.8 to 5.5% relative to the distance between the creel and the loom minimizes breakage of the fibers. For example, for a distance between the creel and the loom of about 252 inches, a sag of about 2 to 14 inches minimizes breakage of the fibers.

Alternatively, or in addition, it has been found that the spread or width of the fibers apart from each other, also known as the reeded dimension, that is generally the same width at the front of the loom as well as at the back has been found to improve the performance of the process of forming the carrier 300. This is contrary to conventional manufacturing methods, which have the back reeded dimension generally wider than the front reeded dimension width.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed is:

1. A carrier of a composite reinforcement system for repairing and/or reinforcing a physical structure, the carrier comprising:
   a plurality of carbon fibers, each carbon fiber having a longitudinal axis and a length extending in an approximately 0 degree direction along a length of the carrier; and
   at least two separate fiberglass fibers each having a longitudinal axis and a length extending in an approximately 90 degree direction across the plurality of carbon fibers,
   wherein the plurality of carbon fibers constitute at least about 70 wt % of the carrier and the at least two separate fiberglass fibers constitute at most about 30 wt % of the carrier, and
   wherein the at least two separate fiberglass fibers cross each other as the at least two separate fiberglass fibers wrap along the length of the carrier.

2. The carrier of claim 1, wherein the at least two separate fiberglass fibers are repeatedly interlaced with the plurality of carbon fibers along the length of the carrier.

3. The carrier of claim 1, wherein the at least two separate fiberglass fibers substantially overlap vertically as the at least two separate fiberglass fibers cross the plurality of carbon fibers.

4. The carrier of claim 3, wherein the at least two separate fiberglass fibers alternate being on top as the at least two separate fiberglass fibers cross the plurality of carbon fibers along the length of the carrier.

5. The carrier of claim 1, wherein the plurality of carbon fibers constitute about 95 wt % of the carrier and the at least two separate fiberglass fibers constitute about 5 wt % of the carrier.

6. The carrier of claim 5, wherein the carrier weighs about 17 ounces per yard.

7. The carrier of claim 1, wherein the carbon fibers of the plurality of carbon fibers are continuous carbon fibers.

8. The carrier of claim 1, wherein each carbon fiber of the plurality of carbon fibers is a 16,000 carbon fiber tow.

9. A composite reinforcement system for repairing and/or reinforcing a physical structure, the system comprising:
a carrier comprising:
a plurality of carbon fibers extending in an approximately 0 degree direction along a length of the carrier; and
a plurality of fiberglass fibers extending in an approximately 90 degree direction across the plurality of carbon fibers,
wherein the plurality of carbon fibers constitute at least about 70 wt % of the carrier and the plurality of fiberglass fibers constitute at most about 30 wt % of the carrier, and
wherein each fiberglass fiber of the plurality of fiberglass fibers crosses another fiberglass fiber of the plurality of fiberglass fibers as the plurality of fiberglass fibers wrap along the length of the carrier; and
a resin system comprising a first resin component and a second resin component, wherein the first resin component and the second resin component are configured to harden upon being mixed together,
wherein the resin system is configured to impregnate the carrier and harden after mixing the first resin component with the second resin component and applying the resin system to the carrier.

10. The system of claim 9, wherein the resin system is an epoxide resin system, a phenolic resin system, a vinyl ester resin system, an acrylic resin system, an unsaturated polyester resin system, a polyurethane resin system, a polyurea resin system, a geopolymer resin system, a silicone resin system, an amide resin system, an alkyd resin system, or a thermoset resin system.

11. The system of claim 9, wherein the plurality of carbon fibers constitute about 95 wt % of the carrier and the plurality of fiberglass fibers constitute about 5 wt % of the carrier.

12. The system of claim 9, wherein the plurality of fiberglass fibers is interlaced into the plurality of carbon fibers, with each fiberglass fiber alternating between crossing over and crossing under subsequent carbon fibers across the plurality of carbon fibers.

13. The system of claim 9, wherein a ratio of the carrier to the resin system impregnated within the carrier is about 1:1 by weight.

14. The system of claim 9, wherein the resin system is configured to adhere the carrier to the physical structure.

15. The system of claim 14, wherein each of the plurality of carbon fibers is a 16,000 carbon fiber tow.

16. The system of claim 9, wherein the plurality of fiberglass fibers is two fiberglass fibers that substantially overlap vertically across the plurality of carbon fibers.

17. The system of claim 16, wherein the two fiberglass fibers alternate being a top fiberglass fiber along the length of the carrier as the two fiberglass fibers cross the plurality of carbon fibers.

18. The system of claim 9, wherein a thickness of the carrier impregnated with the resin system prior to hardening and a thickness of the carrier impregnated with the resin system after hardening are substantially equal.

19. A method of reinforcing a physical structure comprising:
removing a carrier from a container, the carrier including:
a plurality of carbon fibers extending in an approximately 0 degree direction along a length of the carrier; and
a plurality of fiberglass fibers extending in an approximately 90 degree direction across the plurality of carbon fibers,
wherein the plurality of carbon fibers constitute at least about 70 wt % of the carrier and the plurality of fiberglass fibers constitute at most about 30 wt % of the carrier, and
wherein each fiberglass fiber of the plurality of fiberglass fibers crosses another fiberglass fiber of the plurality of fiberglass fibers as the plurality of fiberglass fibers wrap along the length of the carrier;
mixing at least two components of a resin system together to form a resin;
applying the resin to the carrier to impregnate the resin within the carrier;
applying the impregnated carrier to the physical structure; and
allowing the resin impregnated within the carrier to harden with the carrier on the physical structure,
wherein the carrier impregnated with the hardened resin reinforces the physical structure.

20. The method of claim 19, wherein the physical structure is a conduit assembly, a containment structure, a load bearing structure, or a building structure, and the resin is an epoxy resin.

21. The method of claim 20, wherein the physical structure is a concrete cylinder, and applying the impregnated carrier to the physical structure includes wrapping the carrier around the concrete cylinder a plurality of times, with each successive layer of the carrier around the concrete cylinder overlapping at least part of a previous layer of the carrier.

* * * * *